3,030,271
PREPARATION OF *TILIA ALBURNUM* THERA-
PEUTICALLY ACTIVE EXTRACTS
Louis Lafon, Paris, France, assignor to Societe Anonyme
Orsymonde, Paris, France, a French company
Filed July 21, 1959, Ser. No. 828,595
Claims priority, application Great Britain Aug. 7, 1958
9 Claims. (Cl. 167—65)

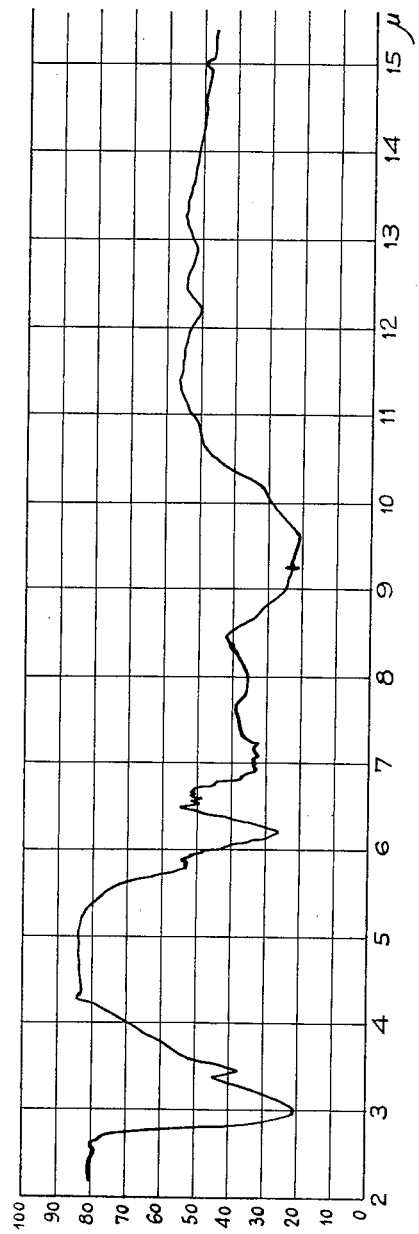

This invention relates to pharmaceutical compositions containing *Tilia alburnum* (or sapwood) extract, more particularly extract of sapwood of Tilia, which compositions are found to possess remarkably cholepoietic properties.

In the treatment of disorders of the liver due to disturbance in the external secretion of that organ, all the treatments heretofore known have generally sought to increase choleresis, that is the volume of bile secreted by the liver. The applicant has now developed and perfected a drug which, in contrast, acts to reduce choleresis while increasing the concentration in the bile of the active principles secreted by the liver.

In preparing one particularly advantageous form of Tilia sapwood extract according to this invention, fragments of sapwood of wild lime are placed in cold water, e.g. in an amount of about 40 grammes per 1000 cc. This mixture is then heated to the boil and boiling is continued until a reduction to about one third of the initial volume. The resulting decoction is filtered. A clear solution is obtained, of a slight aromatic odor and pleasant to the taste.

In a second stage, the decoction is introduced into an homogenizer or the like, and is sprayed through capillary orifices and under high pressure, e.g. of about 250 kg./cm.$^2$, into a chamber through which a strong blast of air is blown. An extremely fine powder is found to settle over the floor and walls of the chamber. This powder herein called an atomisate, is obtained in a proportion of about 4 kg. per 60 kg. sapwood used.

The atomisate can be used therapeutically by extemporaneous dissolution in a glass of water. It is in the form of a greenish yellow powder soluble in water and alcohol and slightly bitter to the taste.

The Tilia sapwood atomisate was subjected to spectrographic analysis. This necessitated certain precautions in the preparation of the test sample. That is, owing to the rather high hygroscopic character of the substance involved, it had to be placed for 24 hours in a vacuum drier containing silica gel. The resulting desiccated product was examined in the solid state by the so-called "pulvo-solid" technique using potassium bromide wafers.

In this technique, a few milligrams of the sample are mixed with about 150 mg. of dehydrated KBr. The mixture is made thoroughly homogeneous and is then compressed in a special vacuum mould, under an applied pressure of 250 kg. per sq. cm. The result is an absolutely transparent cake or wafer. The advantage of this method is that is enables examining a sample in the solid state without having to introduce any additional spectral bands due to the presence of some diluent agent. This is so because potassium bromide shows no adsorption band in the spectral region here used, which is from 2 to 15 microns.

It will be noted that the procedure just described has not resulted in any alteration of the molecular structure of the atomisate, since the spectrum of the bromide wafer and the spectrum of the atomisate mixed with Vaseline, are quite identical.

The spectrometer used was a Perkin-Elmer Model 21 apparatus, with a double beam and equipped with a sodium chloride optics. With this apparatus a spectral curve was obtained as shown in FIG. 1 of the accompanying drawing.

From the atomisate prepared as just described, a dialysate can then be prepared which contains the cholepoietic principles of Tilia sapwood. For the purpose the atomisate can be dialysed for example through a cellophane case, e.g. the material sold by the trade name "Viscors Visking" No. 3, which is about 0.002 mm. thick. The potency of this dialysate can be demonstrated and verified by methods now to be described.

One method of dosing the active principles in the dialysate is based on a technique involving inhibiting the choleresis (bile secretion) induced in an albino rat by means of sodium dehydrocholate, administered e.g. in an amount of 20 mg. per kg. weight of the rat. This technique is, basically, the following.

The test animals, preferably males of uniform breed and weighing about 220 grammes, are held to a water diet from the day before the test. Under "Nembutal" anaesthesia, the choledoch duct is catheterized ahead of (i.e. upstream from) the connection of the pancreatic ducts, and moreover a jugular vein is laid bare for subsequent intravenous injection.

The tests can begin one-half hour after the start of the anaesthesia. The dose of Nembutal used should be sufficiently high to keep the rat under analgesia throughout the experiment, and no further injection should of course be made.

The weight rate of flow of bile, per unit time, is measured e.g. with a Nettler balance sensing 2/100 milligramme, and the "quality" of the bile is estimated by means of an immersion refractometer, e.g. of Zeiss construction, thermoregulated to $25.00°$ C.$\pm 0.02+°$ C. by means of a Höppler ultrathermostat, the illumination being by means of a sodium lamp.

With the above precautions, an accuracy to within $\pm 2$ units of fifth decimal order is obtained, yielding a scale of several hundreds of data items for the appreciation of bile dilution. The so-called basic choleresis value is determined in the bile within the half hour preceding injection I.

Three series of determinations are necessary to provide a significant test of any choleresis modifier. In all cases, tests are performed during the hour following the intravenous injection I, as well as at quarter-hour periods, so as to detect nonrandom causes of disturbance.

In a first of these series of tests, nothing is injected thus providing a test of any factors involving the experimenter, the anaesthetic, the uniformity of breed, sex of the test animals and so on, and especially setting a lower limit for the validity of the subsequent results.

In the second test series, the action of 20 mg. of sodium dehydrochlorate is investigated, introduced endovenously in a total volume of 1 cc. of the aqueous solution thereof. This tests the choleretic used. The peak activity of the choleretic usually occurs within the first quarter-hour after injection I, and, by reference to those conditions that would have obtained in the absence of any injection, an average percentage of increase in the basic choleresis may be defined, which, by arbitrary definition, should be inhibited in the same average period of time by 100 units of the active principle.

The refractometric test in turn permits a definition of a maximum dilution index. The refraction index of the bile, at increasing dilutions, tends to approach the index of water. Here again the index of sodium dehydrochlorate can be reduced to 100 arbitrary units by reference to the conditions that would prevail in the absence of injection, owing to the break in the enterohepatic cycle.

In the series of tests applied to the dialysate, there is injected a total volume of 1 cc. including 20 mg. sodium dehydrocholate and a predetermined volume of the dialysate. The dialysate concentration can then be transposed into units of the active principle by a rule of three.

The same applies to the refractometric test.

Further, the homogeneity of the dialysate is adjusted and controlled. Thus a dialysate considered too weak or too strong with respect to the laboratory standard is modified by dilution or concentration. These adjustments of the dialysate involve the following measures.

Chemical test:
Total sugar by the copper index test.
Total nitrogen by micron-Kjeldahl test.
Ash content test.
Dry residuum test.
Total acidity test by displacement of equilibrium.
Total alkalinity by displacement of equilibrium.

Physical tests:
Density measurement.
Surface tension measurement.
Total electrolyte content by conductimetry.
Refraction index measurement (to within ±2 units of the fifth decimal order).
Optical absorption in the visible spectrum of solutions adjusted to pH 3 and pH 10 with Merck's Titrisol buffers. Colorimetric test with a Zeiss Pulfrich photometer.
Total turbidity measurement as a function of dilution at 25.00° C.±0.02. The turbidity standard is a turbid glass calibrated by Zeiss (technique described in Weissberger's Physical Methods in Organic Chemistry).
Fluorescence measurement in blue, green and red, with the Pulfrich photometer. The fluorescence standards used are permanent fluorescent glasses.

The justification of this latter method of fluorescence measurement is to be found in the intra-red analysis of the pyrolysates of the sapwood atomisate. Such pyrolysates are fluorescent in the blue and their infra-red spectrum shows the presence of an amide function. Moreover, the dialysates are likewise fluorescent and on equilibrium displacement with dilute sodium hydrate an aminaceous odour is perceptible, manifesting the presence within the dialysate of a nitrogenated base or amphoteric group.

The tree from which the sapwood is derived for the purposes of this invention, preferably is *Tilia sylvestris* Desp., also known as *Tilia parviflora* Ehrh., and *Tilia cordata* Mill. To obtain the sapwood, which is the part of the wood that has retained its functional properties, the felled tree can be sawn lengthwise into planks about 1 meter long and 1.5 cm. thick. These planks are then planed so as to remove the crude outer bark, then reduced to a thickness of a few millimeters and finally cut into fragments.

In the alburnum or sapwood of Tilia, a golden-yellow essence can be found containing farnesol, tannins and mucilages. There are no gum ducts but on the other hand numerous cells and pockets containing gum and mucilage are localised within the cortical parenchyma, the pith of the stem, the leaf-stalk and the limb of the leaf.

The applicant has, moreover, prepared extracts of increasing concentration in the active principles of Tilia sapwood. For this purpose two techniques were applied: selective solvent extraction and chromatography.

In an illustrative example, the sapwood atomisate was boiled in a vessel equipped with a reflux cooler for 15 minutes, and was placed in the presence of a mixture consisting of two parts methanol and one part distilled water, in the proportion of 100 g. atomisate per 500 g. of the mixture. The extract liquid was filtered after cooling. The residuum was taken up twice in 250 cc. aqueous methanol. The resulting liquors were evaporated to the dry, in vacuo, in a 70° C. waterbath.

The residuum from the previous evaporation was then exhausted under similar conditions as those described above, first with 500 cc. absolute ethanol during 15 minutes, then twice in 250 cc. of the same solvent. The residuum from this treatment, representing the physiologically active fraction, is dried by moderate heating at 70° C. in vacuo. A chloroform and absolute methanol treatment is then applied in the same way.

The resulting product is purified by passing it over chromatographic columns in the following way:

The cooled residuum obtained from precipitation with organic solvents, weighing about 5 g., is dissolved in a minimum amount of distilled water. To this solution methanol is added until a persistent turbidity appears, and this is eliminated by adding a very small amount of water. The resulting methyl solution is then subjected to chromatography, and the eluate is evaporated to the dry, in vacuo, at 70° C. The new residuum is taken up in a minimum amount of water; to the aqueous solution sulfuric ether is added until the ether is saturated and an homogeneous phase has been obtained. The resulting aqueous ether is then subjected to chromatography and the active principle is evaporated with ether.

Evaporation of the final eluate yields a residue representing about one per mil of the initial atomisate. This residue, hereinafter designated as the extract, contains all of the active principles of the Tilia sapwood, as demonstrated by clinical tests to be described later.

*Clinical study.*—This was conducted on three groups of patients.

(a) Patients suffering from hemicrania of digestive origin, i.e. induced by all fatty food.

(b) Patients suffering from what is usually known as deficiency of the liver, experiencing sickness after taking certain foods, with nausea and sometimes vomiting, slight diffuse cephalea and indistinct pain in the right subcostal region.

(c) Patients subject to painful attacks in the right subcostal region, varying in intensity from a mere feeling of heaviness to hepatic colic. Such pains may be connected with a vesicular or choledochian lithiasis, or further a diseased condition of the cystic syphon or Oddi's sphincter.

Consistently remarkable results were observed in all three groups. The administration of wild lime sapwood atomisate in an average dose of 0.5 g. before each of the three meals inhibits the painful symptoms and headaches. Moreover, in those subjects suffering from liver deficiency, the various symptoms are all favourably modified, especially the nausea which is so troublesome to many patients.

In addition to its symptomatic therapeutic action, the lime sapwood atomisate appears to possess a true curative action, since on termination of the treatment the patients usually derived therefrom a lasting benefit for many weeks.

Aside from its antalgic and eupeptic effects the drug exerts an indisputable sedative action as well as a slight constipating effect which is of interest to those patients suffering from habitual diarrhoea.

It should be noted that in three cases where the patients treated were suffering from complaints which manifestly had nothing to do with the cholecysto-hepatic tract, the treatment failed. These three cases included:

(1) An ulcer operation;
(2) A polypus of the duodenum;
(3) Cephalea probably of menstrual origin.

Thus the lime sapwood extract drug of the invention is seen to have consistently beneficial action both in the case of induced pain and in painful clinical cases.

As a control, a dozen patients were treated by the placebo technique in order to confirm experimentally that the active principles of the lime sapwood are actually present in the dialysate obtained as described above. For this purpose the contents of the dialyser were given to the clinical operators under one code name while the dialysate of the invention was given to them by another code name. The clinical results dramatically demonstrated that the hepatically active principles were in fact contained in the dialysate, not in the contents of the dialysor.

The patients to whom the dialysate was given included:

Six patients suffering from more or less continuous headache;

Three patients complaining of painful attacks in the epigastrum;

Three patients subject to painful attacks in the right intercostal region.

Another series of clinical tests were performed at Hôpital Bichat in Paris on thirteen patients including:

Four sufferers from more or less continuous headache;

One subject to painful epigastric attacks; and

Nine subject to painful attacks in the right intercostal region. These patients were given cachets each containing 0.5 milligram of the lime sapwood extract. In all cases, both before and after the dycholium-morphine test, the taking of two cachets resulted in a cessation of the painful phenomena.

I claim:

1. A method of preparing a therapeutically active extract of *Tilia alburnum* which comprises boiling fragments of *Tilia alburnum* and water until a reduction to about one-third of the initial volume is obtained, filtering the decoctin and spray drying said decoctin thereby to obtain a fine powder which contains the therapeutically active principle of the alburnum.

2. The method of preparing a therapeutically active extract of *Tilia alburnum* which comprises preparing a mixture of about 40 grams of *Tilia alburnum* fragments and about 1,000 cc. of cold water, boiling said mixture until the volume thereof is reduced to about one-third of the initial volume, filtering the decoction thus obtained and spray drying said decoctin thereby to obtain a powder containing the therapeutically active principle of the alburnum.

3. The method which comprises subjecting the powder obtained in accordance with claim 1 to dialysis.

4. The method which comprises boiling, under reflux, for about 15 minutes, the powder obtained in accordance with claim 1 with a mixture consisting of two parts of methanol and one part of distilled water, in the proportion of about 100 grams of said powder per 500 grams of the mixture, cooling the mass, filtering, extracting the residuum on the filter twice in about 250 cc. of aqueous methanol, combining said extracts, and evaporating the same to dryness under vacuum thereby to obtain a concentrate of the active material present in the alburnum.

5. The method which comprises subjecting the material obtained in accordance with claim 4 to extraction, first with 500 cc. of absolute ethanol during about fifteen minutes, then twice in 250 cc. of said ethanol, filtering, and obtaining a residuum on the filter, and drying said residuum at about 70° C. under vacuum.

6. A method of preparing a therapeutically active extract of *Tilia alburnum* which comprises subjecting fragments of said alburnum to the extractive action of a solvent, separating the formed solution from the insoluble portion, and evaporating the solvent from the solution thereby to obtain the solute in the form of a fine powder which contains the therapeutically active principle of alburnum.

7. A product obtained by the method of claim 1.

8. The method of producing cholepoiesis which comprises administering to a subject the active principle of *Tilia alburnum* as obtained by the method of claim 1.

9. The method of producing cholepoiesis which comprises administering to a subject the active principle of *Tilia alburnum* as obtained by the method of claim 2.

References Cited in the file of this patent

UNITED STATES PATENTS

| | | |
|---|---|---|
| 2,152,318 | Liebmann | Mar. 28, 1939 |
| 2,234,063 | Rolle | Mar. 4, 1941 |
| 2,899,313 | Makower et al. | Aug. 11, 1959 |
| 2,904,440 | Dimick et al. | Sept. 15, 1959 |
| 2,971,844 | Bosanic | Feb. 14, 1961 |

OTHER REFERENCES

Hocking, "A Dictionary of Terms in Pharmacognosy," Chas. C. Thomas, Publisher, Springfield, Illinois, 1955, entry "Tilia," page 229.

Wykes, "The Sugar Content of Nectars," Biochem. Journal (Gt. Br.), Vol. 53, No. 2, pp. 294–296, 1933.

Obata et al. "Experimental Studies on The Utilization of Pyroligenous Liquid," (abstract #8420), Biological Abstracts, Vol. 26, pp. 789–790, 1952.

Martindale, The Extra Pharmacopoeia, Vol. I, 24th Edition, April 1958, The Pharmaceutical Press, London, England, pp. 1284–1290 (Vegetable Astringents), p. 1290 "Tilia."

Steinmetz Codex Vegetabilis, 1957, E. F. Steinmetz, Keizers gracht 347, Amsterdam, Netherlands, entry #1142 "Tilia," page 1138 T/M 1144.